June 11, 1963  J. M. HAIT  3,093,173
PEACH PITTER
Filed Feb. 9, 1959  2 Sheets-Sheet 1
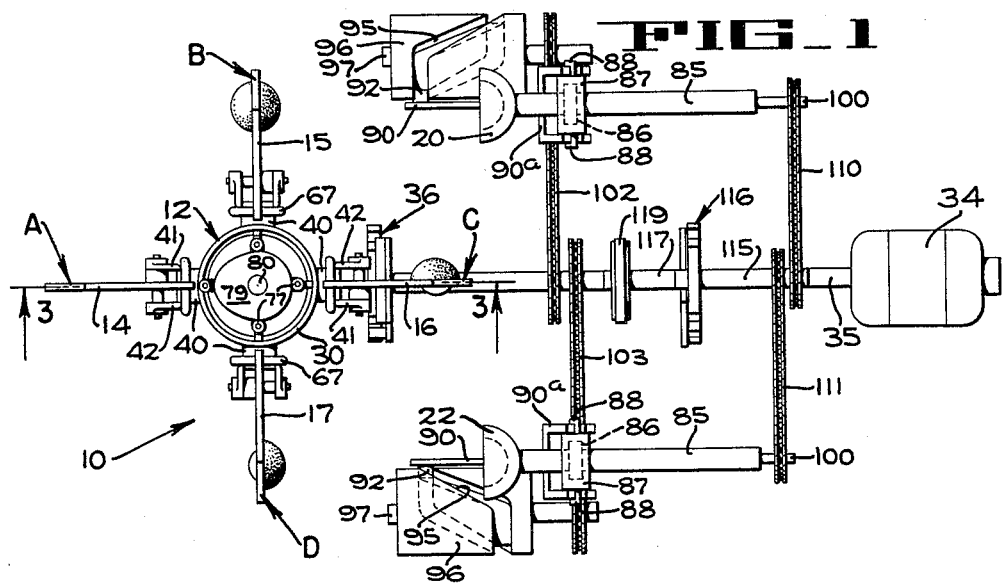
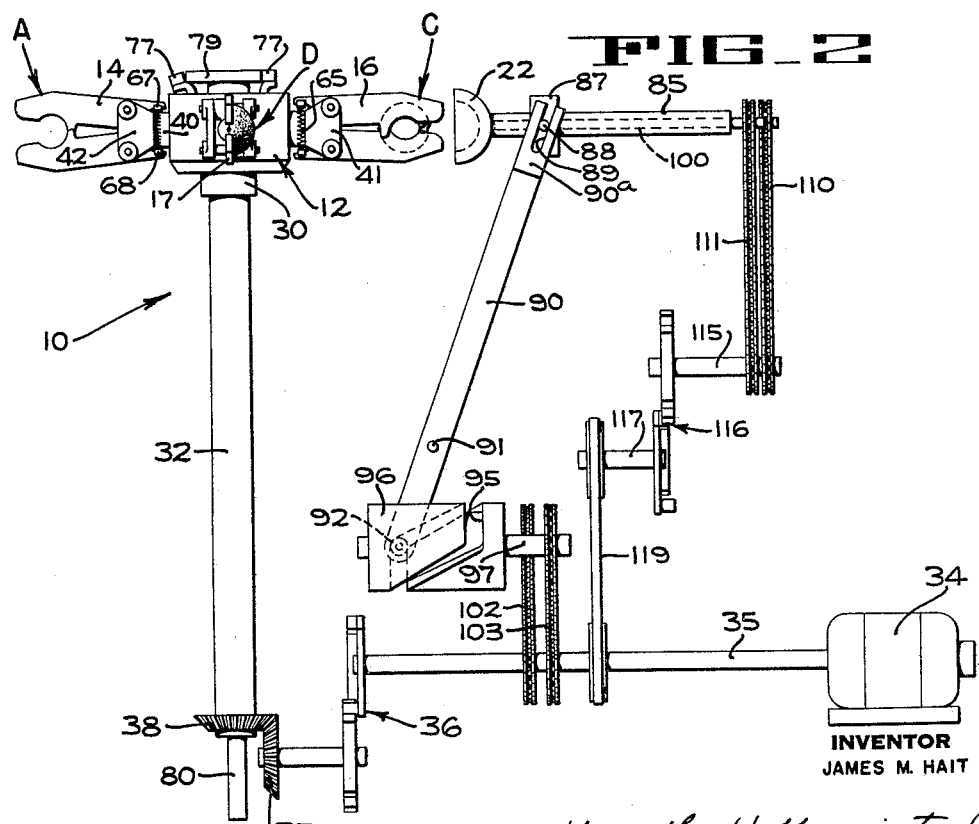
INVENTOR
JAMES M. HAIT
BY *Hans G. Hoffmeister*
ATTORNEY June 11, 1963  J. M. HAIT  3,093,173
PEACH PITTER
Filed Feb. 9, 1959  2 Sheets-Sheet 2
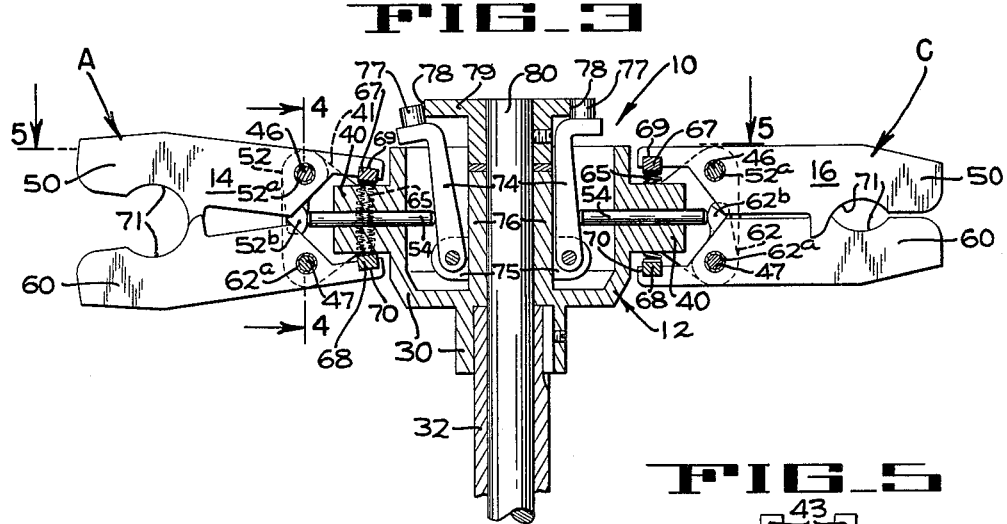
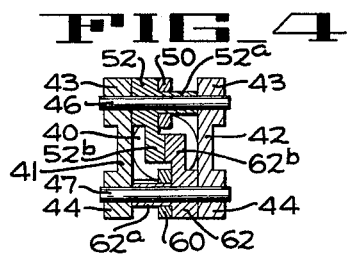
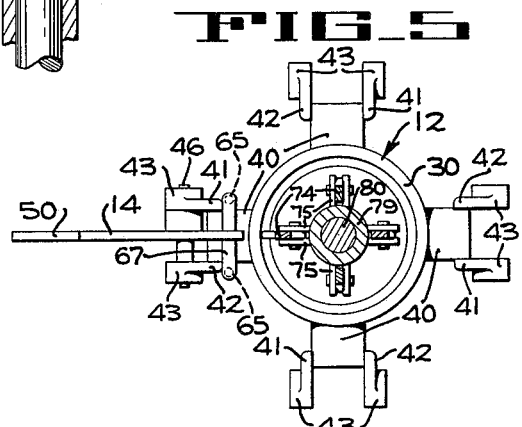
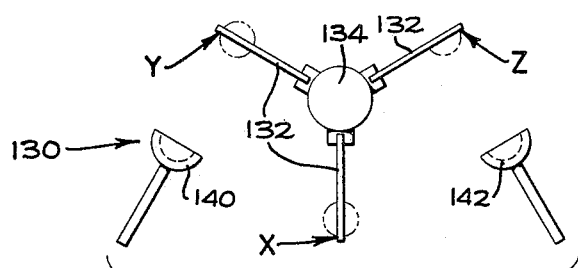
INVENTOR
JAMES M. HAIT
BY Hans G. Hoffmeister
ATTORNEY United States Patent Office 3,093,173
Patented June 11, 1963

3,093,173
PEACH PITTER
James M. Hait, San Jose, Calif., assignor to FMC Corporation, a corporation of Delaware
Filed Feb. 9, 1959, Ser. No. 792,210
6 Claims. (Cl. 146—28)

This invention pertains to the processing of fruit and more particularly relates to a method of pitting peaches and apparatus for carrying out the method.

In one method of pitting peaches, each peach is bisected by means of blades having serrated edges which penetrate the peach and grip the pit. While the pit is held in fixed position, twisting heads engage the peach halves and twist the halves in opposite directions to free them from the pit. To be commercially successful, peach pitting machines of this type must be capable of completely and accurately removing pits and, at the same time, they must be relatively simple in construction so that a minimum of maintenance and adjustment is required during operation.

It is therefore an object of the present invention to provide an improved twist-pitting machine that is simple in construction and efficient in operation.

Another object is to provide an improved method of pitting peaches.

Another object is to provide an improved mechanism for presenting peach halves to the twisting heads of a twist-pitting machine.

Other and further objects of the present invention will become apparent from the following description taken in connection with the accompanying drawings, in which:

FIG. 1 is a diagrammatic plan of the pitting machine of the present invention.

FIG. 2 is a diagrammatic side elevation of the machine of FIG. 1.

FIG. 3 is an enlarged fragmentary vertical section taken on line 3—3 of FIG. 1.

FIG. 4 is a vertical section taken on line 4—4 of FIG. 3.

FIG. 5 is a fragmentary horizontal section taken on line 5—5 of FIG. 3.

FIG. 6 is a diagrammatic plan of a second embodiment of the pitting machine of the present invention.

The pitting machine 10 (FIGS. 1 and 2) comprises a rotatable turret 12 having four peach-bisecting and pit-gripping units 14, 15, 16 and 17 mounted at 90 degree intervals around the periphery of the turret. The turret and each pit-gripping unit thereon is intermittently moved in a clockwise direction (FIG. 1) in 90 degree increments of angular movement around the axis of the turret. At station A a peach is fed to each open pit-gripping unit. As the peach is moved from station A, the pit-gripping unit closes to bisect the flesh of the peach and grip the pit. At station B, a twisting head 20 moves into engagement with one peach half and twists it off the pit which is being held in fixed position by the pit-gripping unit. The remaining peach half and the pit are then carried to an idler station C, and then to a second twisting station D where a second twisting head 22 moves into engagement with the remaining peach half and twists it from the pit. As the pit-gripping unit moves to the feed station A, the pit is released and dropped into a suitable receptacle.

It is to be particularly noted that each pit-gripping unit merely moves in a circular path during the pitting operation. It does not rotate about its own axis, and accordingly the drive mechanism is relatively simple.

The turret 12 comprises a central body portion 30 (FIG. 3) supported on and keyed to the upper end of a tubular drive shaft 32 which is intermittently driven by a motor 34 (FIG. 2) through a drive shaft 35, a Geneva drive mechanism 36, and bevel gears 37 and 38. The arrangement is such that, as the drive shaft 35 is continuously rotated, the turret is intermittently indexed in 90 degree increments of angular movement to successively bring the pit-gripping units to stations A, B, C and D.

The body portion 30 of the turret has four equi-spaced support members 40 (FIG. 5) integrally formed thereon and projecting radially outwardly therefrom. Each support member has two spaced wing members 41 and 42, each of which has two spaced hubs 43 and 44 (FIG. 4). The two hubs 43 support a shaft 46, and the two hubs 44 support a shaft 47. A pit-gripping blade 50 (FIGS. 3 and 4) is mounted on a hub 52a of an actuator arm 52 that is secured to shaft 46 and has an inner end portion 52b that is arranged to be contacted by a push rod 54 (FIG. 3) which is slidably journalled in the associated hub 40. A blade 60, which cooperates with the blade 50 to bisect a peach to the pit and grip the pit, is mounted on a hub 62a and of an actuator arm 62 which has an inner end portion 62b arranged to be engaged by the end of said push rod 54. It will be evident that when the push rod 54 is slid radially outwardly in the support hub 40, the blades 50 and 60 will be swung to their open position. The blades are urged to their closed position by two springs 65 (FIG. 5), which are disposed on opposite sides of the support hub 40. Each spring is compressed between opposed ends of two bars 67 and 68 (FIG. 3), the bar 67 being disposed transversely of blade 50 and disposed in a groove 69 in said blade. The bar 68 is disposed transversely of blades 60 directly below bar 67 and is held in a groove 70 in said blade 60. When the blades 50 and 60 are pivoted to their open position, the springs 65 are compressed to that, when the pressure of the push rod 54 is released, the springs 65 will close the blades 50 and 60 to bisect a peach and move pit-gripping concave edges 71 (FIG. 3) into gripping engagement with the pit.

Each push rod 54 is moved radially outwardly of the turret 12 by a lever 74 (FIG. 3) that is pivotally mounted in spaced ears 75 (FIG. 5) formed on an inner cylindrical wall 76 of the turret 12. The lever 74 has a cam follower roller 77 which rides along the surface 78 of a cam disc 79 that is keyed to a stationary rod 80. As seen in FIG. 1 the cam disc 79 is so designed that each lever 75 is forced outwardly when the associated pit-gripping unit approaches feed station A. Thus, at feed station A the blades are in an open position adapted to receive a peach which may be impaled on the blades manually or by a suitable feed mechanism. During the movement of the pit-gripping unit away from station A, the springs 65 move the blades to closed position in gripping engagement with the pit. The blades continue to grip the pit until they approach the feed station again, after the peach halves have been twisted from the pit.

The twisting heads 20 and 22 may be of any suitable type. For example, each head may comprise a rigid metal cup having a rubber lining that is provided with serrations or ridges which automatically move into gripping engagement with the outer surface of the peach half that is being twisted. Each of the heads 20 and 22 (FIG. 1) is mounted on the end of a tubular shaft 85 that has an annular flange 86 around which a collar 87 is disposed. The flange 86 permits rotation of the collar relative to the shaft 85 but prevents it from moving longitudinally along the shaft. Each collar 87 has a pair of oppositely projecting pins 88 that are adapted to fit into slots 89 (FIG. 2) formed in a yoke-like end portion 90a of a lever 90. Each lever 90 is pivoted on a fixed pin 91 and carries, at its lower end, a roller follower 92 that rides in a camming groove 95 of a cylindrical cam 96 which is keyed to a shaft 97. As the cam 96 rotates with the shaft 97, the lever 90 is oscillated about pivot pin 91 causing the tubular cup support shaft 85 to slide along a spline shaft 100 toward and away from the associated twisting station B or D.

The cylindrical cam drive shafts 97 are driven by the drive shaft 35 through chain and sprocket drive mechanisms 102 and 103 respectively. Since the indexing of the turret 12 and the reciprocating movement of the twisting heads are controlled from the same drive shaft 35, it is evident that these movements can be coordinated so that the twisting heads move into the twisting stations B and D when pit-gripping units are held in stationary position at these stations.

When the twisting heads 20 and 22 are disposed in engagement with peach halves held on the pit-gripping units, the heads are rotated to twist the peach halves from the pits, and this rotation of the heads is accomplished by two chain and sprocket drives 110 and 111 which connect the two spline shafts 100 to the driven shaft 115 of a Geneva drive mechanism 116. The Geneva drive shaft 117 is connected by a belt and pulley drive 119 to the continuously rotating drive shaft 35. The arrangement is such that, when the twisting heads 20 and 22 have been moved into engagement with peach halves at stations B and D, the heads are rotated to twist the peach halves free and then the heads are withdrawn from the twisting stations to permit the turret to be indexed.

It will be understood that suitable support structure is provided for journalling and supporting the various operating parts of the machine including the spline shafts 100, the Geneva shafts 115 and 117, the cylindrical cam shafts 97 and the stationary rod 80 of the turret.

From the foregoing description it will be particularly noted that the pit-gripping blades are maintained in upright, substantially vertical position during the entire pitting operation. Also, it should be noted that the twisting heads have a simple, straight line reciprocating movement toward and away from the twisting stations. Accordingly, the mechanisms employed to carry out these movements are simple and compact.

In FIG. 6 a second embodiment of the pitting machine of the present invention is illustrated. In this machine 130, three pit-gripping blade units 132 are mounted in radial positions on a turret 134. The turret is intermittently rotated in 120 degree increments to move each pit-gripping unit in a clockwise direction from a feed station X to a first twisting station Y and then to a second twisting station Z. While the turret is stationary, two twisting heads 140 and 142 are moved into the twisting stations Y and Z to grip the peach halves on the pit-gripping units and twist them from the pits. The heads are then retracted and the turret is again indexed to bring different peach halves to the twisting stations.

The pit-gripping units, the turret, the twisting heads and the coordinated drive mechanism may be of the same general type disclosed hereinbefore in connection with the pitting machine of FIGS. 1 to 5 inclusive. It will be noted that, in this second embodiment of the pitting machine of the present invention, the pit-gripping blades are also held in a generally vertical position during the entire pitting operation and the peaches are not rotated but are carried in a single, substantially horizontal plane.

It will be recognized from the foregoing description that the present invention provides two simple pitting machines, each of which employs a particularly effective mechanism for positioning peach halves in alignment with the twisting heads of a twist-pitting machine.

Having thus described my invention, what I claim as new and desire to protect by Letters Patent is:

1. A pitting machine comprising a turret mounted for rotation about a vertical axis, flat faced cutting and gripping means mounted on said turret and arranged when actuated to cut into a whole peach to make a vertical planar cut in the peach to bisect the flesh of the peach and grip the pit, means for actuating said cutting and gripping means, a pair of twister heads mounted in spaced relation adjacent said turret on the same side of the turret, and means for rotating said turret for moving said cutting and gripping means in a direction normal to the flat faces thereof toward and away from said twisting heads for successively presenting opposite halves of a peach supported by said flat faced cutting and gripping means to different ones of said twister heads.

2. A pitting machine comprising a turret mounted for rotation about a vertical axis, a pair of flat faced gripping blades mounted on said turret and movable in a vertical plane from an open position to a closed position wherein the blades bisect the flesh of a peach and grip the pit, a pair of twisting members disposed on one side of the flat faces of said blades, drive means connected to said turret for successively aligning each half of a peach held by said blades with one of said twisting members, means operatively connected to said drive means and to each twisting member for moving each twisting member into engagement with an aligned peach half, and means operatively connected to said drive means for rotating each twisting member about an axis normal to the flat faces of said blades.

3. A pitting machine comprising a turret mounted for rotation about a vertical axis, a pair of blades carried by said turret for unitary movement therewith and for movement in a vertical plane from an open position to a closed position wherein the blades bisect the flesh of the peach and grip the pit, means for successively indexing said turrent to a plurality of stations including two spaced twisting stations, a twisting head disposed alongside said blades at each twisting station, means mounting each twisting head for movement in a horizontal direction into engagement with a peach half supported by said blades, and means for rotating said twisting heads to twist the engaged peach half from the pit.

4. A peach pitting machine comprising a turret mounted for rotation about a vertical axis, a pair of blades mounted on said turret for unitary movement therewith about said vertical axis and for movement in a vertical plane to bisect a whole peach and grip the pit thereof, means defining two spaced twisting stations, means for rotating said turret 180° about said vertical axis to move said blades from said first twisting station to said second twisting station, and means at each station for engaging and twisting a peach half from the pit gripped by said blades.

5. A pitting machine comprising a turret mounted for rotation about a vertical axis, a pair of gripper blades mounted on said turret and movable in a vertical plane from an open position to a closed position wherein the blades bisect the flesh of the peach and grip the pit, means for indexing said turret through successive 120 degree increments of angular movement to successively position said gripper blades at three processing stations, a first twister head disposed adjacent to said blades when said blades are at a first one of said stations, means for moving said first twister head toward said blades to engage a peach half on one side of said blades at said first station, a second twister head disposed adjacent the opposite side of said blades when said blades are at a second one of said stations, and means for moving said second twister head into engagement with a peach half held on said opposite side of said blades at said second station.

6. A pitting machine comprising a pair of cooperating generally planar blades arranged to cut into a whole peach to make a planar cut to bisect the peach and grip the pit, means mounting said blades for conjoint swinging movement in a fixed plane from a first twisting station to a second twisting station, a pair of twister heads, each head being mounted at one of said stations for movement along a path generally normal to said blades when said blades are at the associated station, means for moving each twister head along said normal path into engagement with a peach half supported by said blades, and means for actuating said twister head to twist the peach half from the pit.

References Cited in the file of this patent

UNITED STATES PATENTS

| | | |
|---|---|---|
| 596,343 | Topp | Dec. 28, 1897 |
| 1,389,795 | Thompson | Sept. 6, 1921 |
| 1,455,323 | Cummings | May 15, 1923 |
| 2,664,127 | Perrelli | Dec. 29, 1953 |
| 2,730,149 | Aguilar et al. | Jan. 10, 1956 |
| 2,818,098 | Perrelli | Dec. 31, 1957 |
| 2,826,227 | Perrelli et al. | Mar. 11, 1958 |
| 2,880,774 | Perrelli | Apr. 7, 1959 |